United States Patent [19]

Springer

[11] Patent Number: 5,616,903
[45] Date of Patent: Apr. 1, 1997

[54] ELECTRONIC RANGEFINDER APPARATUS

[75] Inventor: Jon W. Springer, Riverton, Wyo.

[73] Assignee: The Brunton Company, Riverton, Wyo.

[21] Appl. No.: 378,537

[22] Filed: Jan. 26, 1995

[51] Int. Cl.⁶ .............. G06F 19/00; G06G 7/80; G01C 3/22; G01C 5/00
[52] U.S. Cl. .............................. 235/414; 356/21
[58] Field of Search .................. 239/404, 414; 356/21, 20; 33/246

[56] References Cited

U.S. PATENT DOCUMENTS

| | | | |
|---|---|---|---|
| 3,190,003 | 3/1962 | O'Brien | 356/21 |
| 3,782,822 | 1/1974 | Spence | 356/21 |
| 3,906,189 | 9/1975 | Schmookler | 235/414 |
| 4,531,052 | 7/1985 | Moore | 235/404 |
| 4,561,204 | 12/1985 | Binion | 42/1 ST |
| 4,617,741 | 10/1986 | Bordeaux et al. | 356/21 |
| 4,720,804 | 1/1988 | Moore | 364/525 |
| 4,777,352 | 10/1988 | Moore | 235/404 |
| 4,787,739 | 11/1988 | Gregory | 356/21 |
| 4,837,717 | 7/1989 | Wilkund et al. | 364/563 |
| 4,886,347 | 1/1989 | Monroe | 56/12 |
| 4,965,439 | 10/1990 | Moore | 356/21 |
| 5,020,902 | 6/1991 | van Heyningen | 356/21 |
| 5,089,816 | 2/1992 | Holmes, Jr. | 340/971 |
| 5,170,204 | 12/1992 | Mukai et al. | 354/409 |
| 5,171,933 | 12/1992 | Eldering | 235/414 X |
| 5,210,624 | 5/1993 | Matsumoto et al. | 359/13 |

*Primary Examiner*—Donald T. Hajec
*Assistant Examiner*—Le Thien Minh
*Attorney, Agent, or Firm*—John E. Reilly

[57] ABSTRACT

A rangefinder for scopes and binoculars in which a transparent display has a scale or other height-determining member to determine the height of the object viewed through the display and compare with a known object height selectively displayed on the same display, the actual height and known height being recorded and processed through a programmable logic circuit which calculates the range or distance of the object from the display based on actual height and known height. The programmable control circuit may also include a list of known object heights which can be selected and displayed on the display.

19 Claims, 3 Drawing Sheets

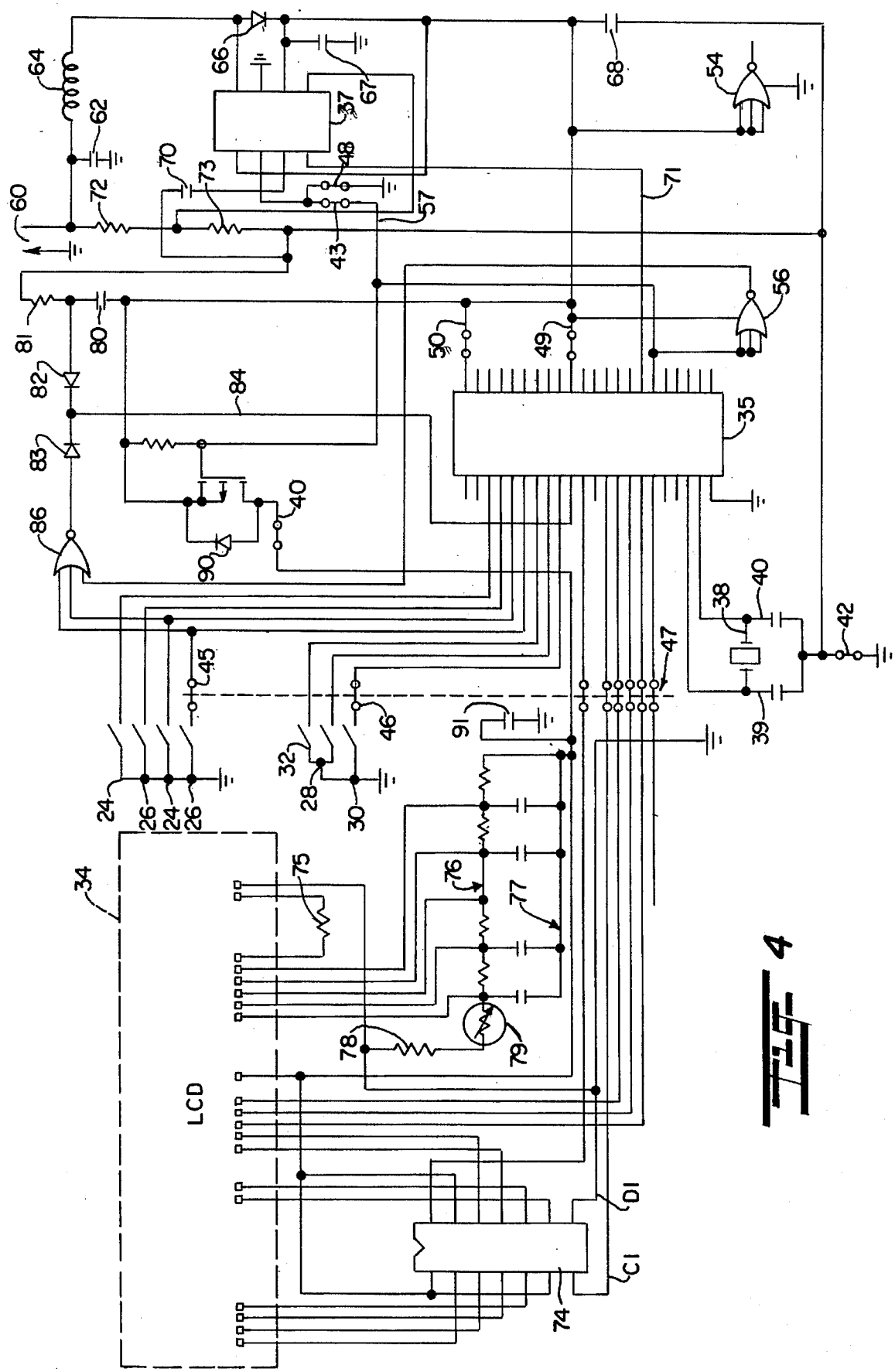

5,616,903

ELECTRONIC RANGEFINDER APPARATUS

BACKGROUND OF THE INVENTION

This invention relates to rangefinders; and more particularly relates to a novel and improved method and apparatus for determining the range or distance of an object which is particularly adaptable for use in rifle scopes and other powered scopes, such as, binoculars.

Various approaches have been taken in the design and construction of rangefinders to the end of simplifying both the method and apparatus for range finding as well as to provide a device which is compact, highly accurate and dependable in use. Mechanical ranging instruments from rifle scopes to electronic rangers are based on the trigonometric relationship between the known height of a distant object and the angle it presents to the viewer. Thus, when the viewer focuses on a distant object for the purpose of determining its range or distance, it is possible to make that determination in accordance with the formula $$x = \frac{h}{\tan\Theta}$$

where h equals known height of the object and $\Theta$ equals the Minutes of Angle (MOA) between imaginary lines extending from the viewer to the top and bottom of the object being viewed. In order to determine the actual or target height of the object, it is customary practice to employ a reticle scale on a see-through display with a predetermined spacing between elements or marks on the scale based on a spacing of 2.5 MOA between elements or marks. For example, assuming that ten marks on the display equal 4' in height at 100 yards, the spacing between adjacent marks equals 0/076° C. or 2.5 MOA. Of course, for greater accuracy, the spacing between marks on the scale can be reduced. In any event, the target or object being viewed is lined up in the display such that the bottom of the target is at a reference line on the display and the marks on the scale will be arranged in ascending order from the reference line so that the user can match or determine which one of the selected marks is aligned with the upper edge of the object and which would represent its actual height above the reference line. Selection of that mark by the user when transmitted to a microprocessor is then placed in the formula together with the known height of the object.

In the past, efforts have been made to integrate all of the procedures necessary to calculate distance into a single optical package so that it is not necessary for the user to look away from the display or object sighted in carrying out the range finding operation.

Representative of approaches taken in the past are those disclosed in U.S. Pat. Nos. 4,787,739 to Gregory, 4,531,052 to Moore and 5,020,902 to Kits Van Heyningen et al. For example, in Van Heyningen, the digital display is transparent and positioned in the optical path such that the object can be viewed through the display, and the user inputs the actual or target height of the target object by controlling the number of bar segments shown on the display so that the uppermost bar segment which appears on the display is aligned with the upper edge of the target object, and the user may then enter that height by closing a switch to enter that reading into the microprocessor. Another switch is then closed to enter the known height of the object by incrementing another digital display until the value of the digit shown on the display is equal to the value of the digit for the known height. However, that known height value must be obtained by the user from a separate chart or by the user's own knowledge of actual height of the object. Then, by depressing or closing another switch to advance the microprocessor into the range mode, the necessary calculation is made to determine range based on the actual height and known height values entered, and the range is then displayed to the user. In the '052 patent to Moore, multiple images of the object are stored which are representative of the object at different distances from the observer and then compared with the object as viewed. In the '739 patent to Gregory, the multiple objects which are stored can have different sizes representative of the objects at different distances from the observer.

It is highly desirable to integrate a chart displaying known heights of different objects into the apparatus and in such a way that those known heights may be called up and presented on the same display as provided for viewing of the object so that the user can simultaneously view the magnified object and, through finger-operated switches, operate the display to select the known height from the chart displayed of known heights without refocusing the eyes or having to rely upon the user's memory for a wide range of different known heights for various objects to be viewed. Furthermore, it is also desirable to provide for novel and improved reticle scales and methods and means for displaying the actual or target height which are simple to operate and highly accurate.

SUMMARY OF THE INVENTION

It is therefore an object of the present invention to provide for a novel and improved range finding method and apparatus; and further to provide a ranging device that is adaptable for use in binoculars, minoculars, rifle scopes and other powered scopes as a complete optical package or as a self-contained module for incorporation into other's optical packages.

It is another object of the present invention to provide for a range finding method and apparatus which will enable a user to simultaneously view an object or target along an optical path of the apparatus, to make actual height and known height determinations and to enter same for the purpose of calculating range without having to look away from the object or otherwise refocus on the object.

It is a further object of the present invention to provide a novel and improved rangefinder apparatus which requires a minimum number of steps to operate, is extremely compact and readily conformable for use with different types of powered scopes in determining range or distance of an objection from the user.

It is an additional object of the present invention to provide in rangefinder apparatus for novel and improved circuitry and software for determining the range or distance of an object; and specifically wherein the necessary switch controls for the circuitry are incorporated into the housing for the apparatus whereby to facilitate operation of the display and range calculations by the user.

In accordance with the present invention, a rangefinder apparatus has been devised in which a scope includes a transparent display at a plane of focus between an occular and objective lens, the display having height-determining means for alignment with an upper edge of a target object viewed through the display, first recording means for recording a numerical value corresponding to the vertical distance of the height-determining means from a reference point on the scale whereby to correspond to the height of the target object viewed through the display, second recording means for recording a numerical value corresponding to a known height of the target object viewed in the display, programmable control means for calculating the distance of the target object from the display based on the recorded numerical values transmitted to the control means, and means for displaying the range calculated by the control means on the display.

In a preferred embodiment, the display includes a reticle scale provided with a series of numerical units in vertically ascending order, the units being calibrated in relation to distance of a target from the display, the first recording means recording that unit corresponding to the height of the target object viewed through the display, and the control means includes a list of known object heights which can be selectively displayed on the display to correspond to the target object being viewed.

In another embodiment, the height-determining means includes a series of adjustable shutters defining a variable-sized central aperture therebetween, and drive means for adjusting the shutters until the size of the aperture corresponds to the height of the target object; or the height-determining means may be comprised of a movable pointer and means for incrementing the pointer in a vertical direction to align the pointer with an upper edge of a target object being viewed.

In still another form, the units on the scale may comprise a series of units which are calibrated in vertical ascending order in relation to distance of a target object, and the height-determining means includes means for selecting one of the units corresponding to the actual height of the target object and displaying on the display.

The ability to make actual height and known height determinations and to enter same for the purpose of calculating range without having to look away from the object or otherwise refocus on the object is a common feature to all forms of invention hereinabove described and to be hereinafter described in more detail.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 4 is a somewhat schematic electrical diagram of logic circuit for the preferred form of present invention.

DETAILED DESCRIPTION OF PREFERRED EMBODIMENT

Figure 1:
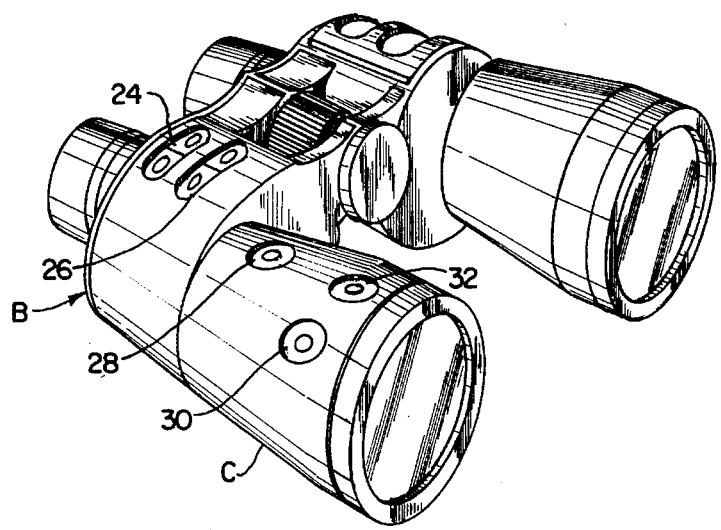
FIG. 1 is a perspective view illustrating the preferred form of invention housed in a pair of binoculars in accordance with the present invention.
Figure 2:
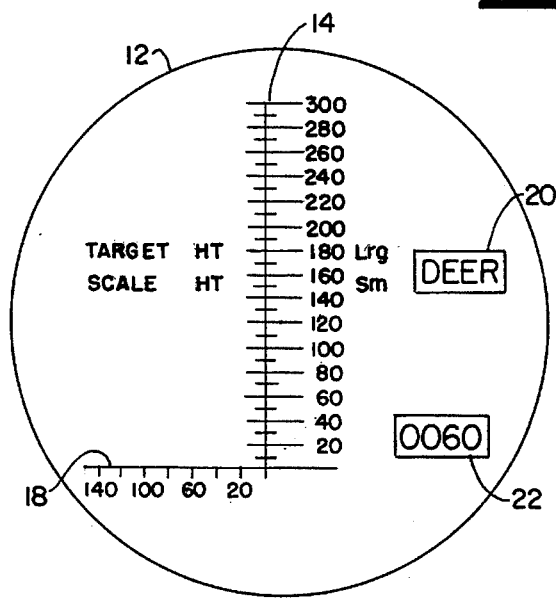
FIG. 2 is a front view in elevation of a preferred for/of LCD display in accordance with the present invention.
Figure 3A:
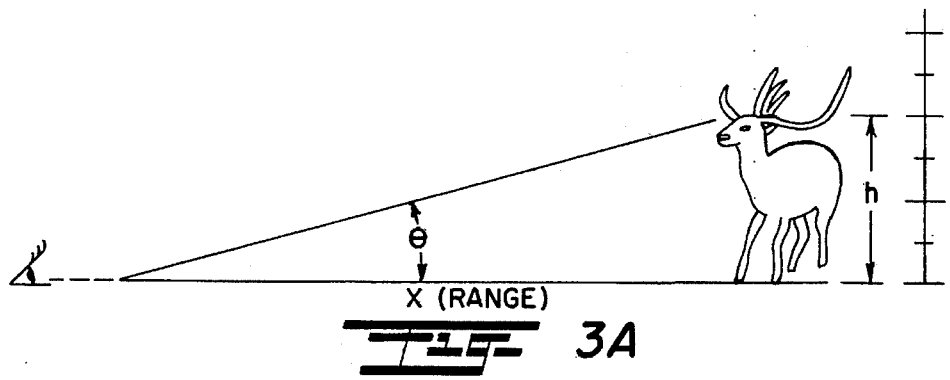
FIG. 3A is a schematic diagram illustrating the parameters for determining range in accordance with conventional practice.
Figure 3:
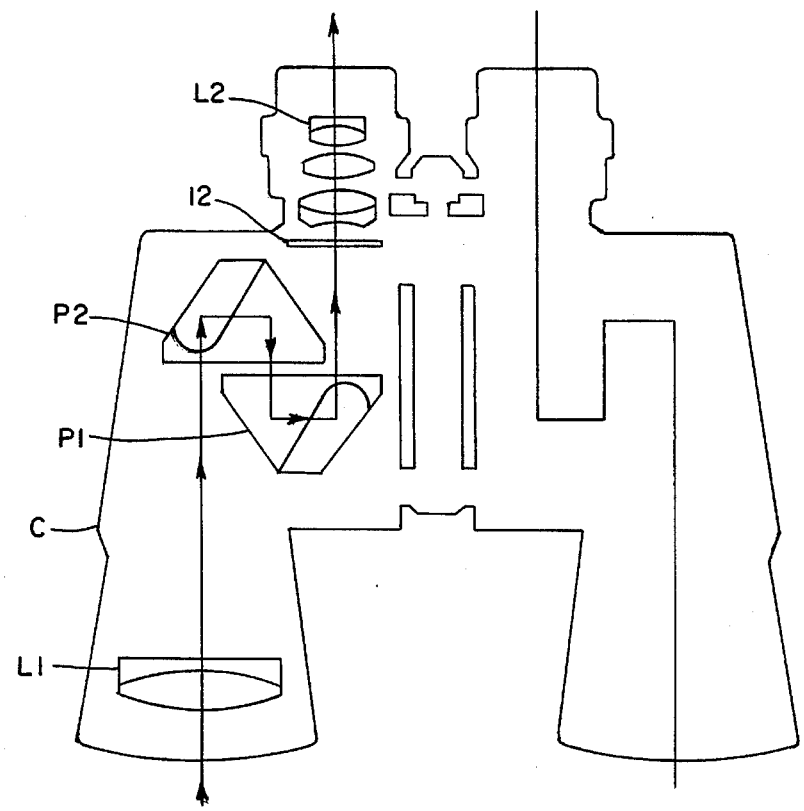
FIG. 3 is a schematic diagram of an optical system/within the binocular incorporating the display of the present invention.

Referring in more detail to the drawings, as shown in FIGS. 1 to 3, a preferred form of electronic ranging device is broadly comprised of a reticle in the form of a display 12 having a vertical fixed-stadia scale 14 calibrated in minutes-of-angle (MOA). The reticle 12 can be mounted in various optical sighting devices or scopes, such as, for example, one side of a pair of binoculars B as illustrated in FIG. 1 and 3 wherein the reticle 12 is in the form of a see-through LCD display mounted in the optical path between occular lens L1, prisms P1 and P2 and an eyepiece or objective lens L2 such that the focal point of light is at the reticle 12. In a manner to be described, the reticle or display 12 when inserted into the optical path of the scope will allow the user to simultaneously view the magnified object whose range is to be determined and, with finger-operated buttons on the casing C of the binoculars B as hereinafter described, operate the display to determine the range or distance of the object without refocusing the eye(s).

FIG. 2 illustrates the preferred form of display 12 having the vertical scale 14 with numerals arranged and displayed in upward ascending order from a horizontal base or reference line 18. The vertical scale 14 is calibrated to designate the height of the target object in Minute-Of-Angle (MOA) from 0 to 300. An Alpha display 20 will display selected target names or numerals representing size of target. For example, the Alpha display 20 will display the name "deer" or a number, such as "0004" to represent the height of a deer. These names or numbers are selected from a chart of objects stored in memory and are scrolled through by the operator or observer until a match is made with the object being observed. Numerical display 22 establishes units of measurement for the distance in feet, yards or meters.

As illustrated in FIG. 1, the reticle 12 is controlled by a series of button-controlled switches wherein button 24 controls a rocker switch to operate the Alpha display 20, the plus sign on the switch denoting incrementing and the minus sign denoting decrementing until the number displayed corresponds to the actual height of the target object. Button 26 controls a rocker switch which sets the scale or reticle height of the target object by incrementing or decrementing in the same manner as the switch 24 to display the scale or reticle height of the target object at the Alpha display 20. As noted, the button 28 can toggle the display 20 from a display of numbers representing the height of the target object to names of the object and can select whether the object is "LARGE" or "SMALL", such as, a large deer or small deer by illuminating either "Lrg" or "Sm". When a name is displayed on the Alpha display 20, the memory will automatically register or record the numerical value representing the height of that object for purposes of making the range calculation. The button 30 cycles the unit through feet, yards and meters as displayed on the display 22, and the button 32 causes the instrument to switch between "range" mode and "chrono" mode but form no part of the present invention.

The buttons 24, 26, 28, 30 and 32 are spaced on the upper surface of the casing C along one side of the binoculars so as to be easily accessible and can be operated with the four fingers of the hand holding the binoculars. For example, the button 26 can be operated with the index finger to indicate the actual height of the target object on the reticle scale 14, and the button 24 operated with the middle finger to display target height or name of the target object as determined by operation of the button 28 by the third finger. The units for the target height in display 20 always correspond to the distance units of the display 22.

As shown in the schematic diagram of FIG. 4, a microcomputer 35 is a standard CMOS 8-bit device which receives input from the switches SW1–SW7 associated with the buttons 24, 26, 28, 30 and 32 as illustrated. The microcomputer 35 has its own internal read-only memory which is used for storing the rangefinder and stop/clock routines. This ROM memory may be programmable (EPROM) or non-programmable (masked ROM). A part of the memory may be used for test diagnostics to test the circuit and program before and after assembly. The microcomputer also receives input from power controller 37, processes it along with the input from the switches SW1–SW7 and outputs data to an LCD module 34 for the display 12. A crystal oscillator 38 along with the coupling capacitors 39 and 40 provide the time base for the microcomputer. For example, the oscillator may be a 3.57954 MHz crystal. Resistors 42 to 50 operate as zero-ohm jumpers to assist in routing traces on a printed circuit flex card, not shown. The inputs of NOR gate 54 are tied to logic high, and a wake/enable line 55 is inverted by NOR gate 56 to create a "sleep" line 57 which controls the power switch for the serial/parallel converter 74 and the LCD display module 34. The "sleep" line 57 also selects the output voltage of the power controller 37. Upon reset, all control lines are returned to a logic high.

A power source 60 may consist of a pair of 1.5 V AA batteries connected in series, and the power controller 37 is a step-up DC-DC switching regulator that uses pulse frequency modulation to step up the 3 VDC battery input to the 3 VDC/5 VDC required by the system. A capacitor 62 buffers the batteries to insure adequate current to the power controller 37, the inductor 64 storing the energy produced by the high frequency switching, and a diode 66 rectifies the energy at the output. The output is filtered by capacitors 67 and 68 to reduce the noise caused by the high frequency switching of the controller 37. A capacitor 70 decouples the unused precision voltage reference.

A 5 VDC or a 3.3 VDC output mode can be obtained depending upon the logic level impressed upon the 5 V/3 V pin of the power controller 37 by the "sleep" line 57. The power controller 37 supplies 5 VDC when running but reduces the supply to 3.3 VDC in the "sleep" mode for power conservation. In addition, the power controller 37 monitors battery voltage with a voltage divider consisting of resistors 72 and 73 that produces an alarm signal on the battery/monitor line 71 when the battery voltage drops below approximately 2 VDC.

A serial/parallel converter 74 receives the serial output from the microcomputer 35 and converts it to a parallel data format for the driver for the display module 34, the control output from the microcomputer 35 being routed directly to the driver. Two serial lines, "data" line $D_1$ and "clock" $C_1$ are connected to the converter 74. The conversion sequence is executed by sending the "data" value, then latching this into the converter with a "clock" pulse. This is repeated eight times resulting in an 8-bit value at the converter's parallel outputs. This communication is not bidirectional. A resistor 75 controls the oscillation frequency of the LCD driver, and a resistor divider network 76 creates the bias voltages for the drivers multiplexed waveforms. Capacitors 77 decouple the bias voltages. Resistor 78 and thermistor 79 set the LCD display's optimum operating voltage, and the thermistor 79 compensates for low temperatures.

The LCD driver is currently a parallel input device, but a serial driver could be used and the serial-to-parallel converter 74 eliminated. The LCD driver uses the parallel data and the control signals from the microcomputer 35 to generate the multiplexed waveforms that drive the LCD display. The LCD display module itself may comprise an LCD driver LSl-chip and the LCD display.

A power-up circuit consisting of capacitor 80 and resistor 81 are connected in series between the power supply and ground and operates as a high pass filter that uses the abrupt change in supply voltage to reset the microcomputer 35. The junction between the capacitor 80 and resistor 81 is connected to one input of a diode OR gate 82 whose output is tied to reset line 84 of the microcomputer 35.

A "sleep" mode is used by the microcomputer 35 to conserve power while preserving the RAM when the unit is not in operation. To exit from a "sleep" condition, the increment sides of the buttons 24 and 26 must be pressed simultaneously, and to put the instrument to sleep, the decrement sides of the buttons 24 and 26 must be pressed simultaneously. The wake-up-from-sleep circuit includes a three input NOR gate 86. When buttons 24 and 26 are pressed and "wake enable" is a logic low, the output of the NOR gate 86 is a logic high. This is briefly passed to the other input of the diode OR gate 83 whose output is connected to the reset pin in the microcomputer 35 resulting in a system reset. When the microcomputer 35 is running, the "wake enable" line is asserted logical high by the microcomputer 35 thereby disabling the gate 86 and prevents a microcontroller reset if the buttons 24 and 26 are pressed simultaneously while in use.

The "sleep" line 89 controls a field-effect transistor 90 to turn off the converter 37 and LCD display module to conserve power. A logic low on the "sleep" line turns the transistor 90 on and provides power to the external circuits. A decoupling capacitor 91 filters any noise caused by the switch or transistor 90.

FIG. 3A schematically illustrates the optical system and calculation to be performed by the microcomputer in determining range or distance of an object from the viewer. The calculation is performed based on the algorithm $$X = \frac{H}{\tan\Theta}$$

where X=range, H=known height, and $\Theta$=angle presented by the scale markings on the reticle scale in MOA. For the purpose of illustration, if the object is a deer, the known height is dialed in as "0004" or called up from memory as "deer" on the display 20. The illustration shows the deer at a height of 0.4, or 4 marks, which represents 5×4=20 MOA.

$$X(\text{Range}) = \frac{h}{\tan\Theta} = \frac{004 \text{ feet}}{\tan\frac{20}{60} \text{ degrees}} = 688 \text{ ft} = 230 \text{ yards} = 210 \text{ meters}$$

In practice, the range finding apparatus of the present invention is made integral to a fixed power scope of some type, such as, the binoculars B as illustrated in FIG. 1. The button 26 is in the form of a two-position rocker switch which is operated by the index finger to indicate the height of the target object from units ascending from 0.0 to 300 on the reticle scale 14 and which would appear on the display 20. The button 24, also a two-position rocker switch, can be operated by the middle finger to enter the actual or known height of the target object, such as, the number "0004" for a 4' deer as described earlier. For those operators who don't know object heights, they will be able to select a preprogrammed object from a list displayed at 20 by operating the button 28 which transfers control of the button from sequencing numbers on the display 20 to displaying names of different known objects, such as, "deer" The button 30 will cycle the units through feet, yards and meters so that the units for the target height in display 20 always match the distance units of display 22.

DETAILED DESCRIPTION OF MODIFIED FORMS OF INVENTION

Figure 2A:
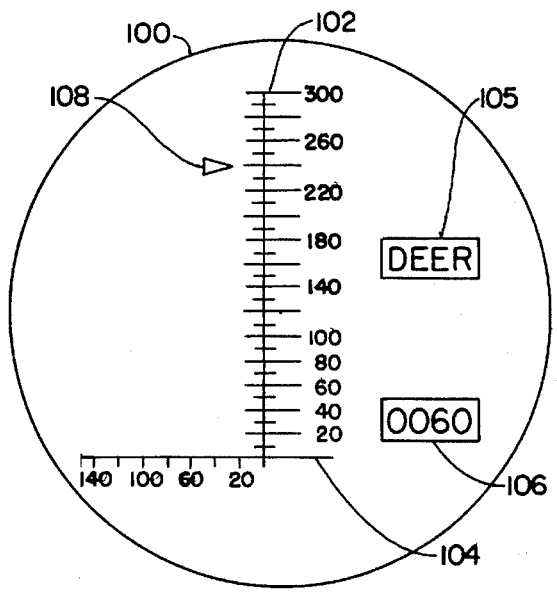
FIG. 2A is a front view in elevation of a modified form of LCD display.
Figure 5:
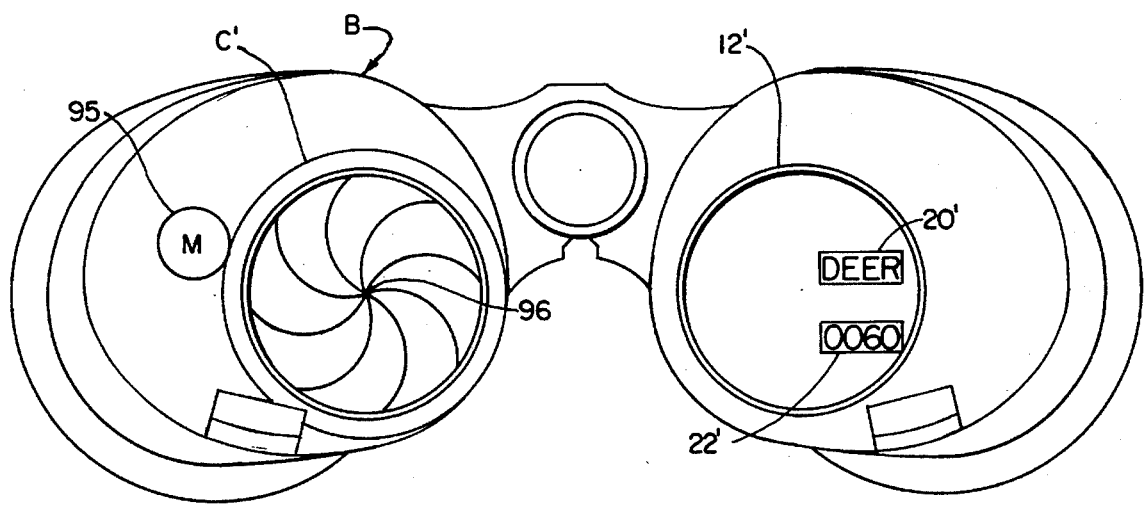
FIG. 5 is an end view of a pair of binoculars showing another modified form of the present invention.

The modified form of invention illustrated in FIG. 5 requires the use of both sides of a pair of binoculars and like elements to those of FIGS. 1 to 3 are correspondingly enumerated. One side of casing C' of the binoculars B contains an iris-diaphragm or shutter arrangement 94 which is driven by a conventional motor drive represented at 95 to regulate the size of aperture 96 at the center of the iris-diaphragm 94 and is mounted at the focal point of the optical path in a lens system corresponding to that illustrated in FIG. 3. The display 12' is mounted in the other side or casing C" of the binoculars. Thus, the reticle scale 14 and its reference or base line 18 are replaced by the iris-diaphragm 94 which through the motor 95 is controlled in size by the button 26. This action allows the operator to "frame in" the target with the aperture, and the aperture size or diameter selected is encoded into the microprocessor 35 of FIG. 4 to record the scale height. In a manner corresponding to that previously described with reference to FIGS. 1 to 3, the known target height is selected with the button 24 and appears on the display 20'. The range then appears at 22' of the display 12'. In still another modified form of invention illustrated in FIG. 2A, a display 100 is intended to function in the same manner as the display 12 of FIG. 2. Accordingly, a reticle scale 102 includes suitable numerical units in vertical ascending order from a base line 104, and display areas 105 and 106 correspond to the display areas 20 and 22, respectively, of the preferred form of FIG. 2. In order to facilitate reading of the target height, a movable pointer 108 appears on the display in juxtaposed relation to the scale 102 and can be advanced vertically by incrementing or decrementing button 24 so that the pointer 108 can be positioned at the value on the scale 102 which is level with the upper edge of the target and with the lower edge of the target aligned with the base or reference line 104. The position of the pointer is then encoded or recorded by the microprocessor which will translate that position into a numerical value. In a manner corresponding to that described with reference to FIG. 2 and FIG. 4, the known height of the target can be displayed in the display area 105 and can be encoded into the microprocessor for the purpose of calculating range which then appears in the display area 106. Of course in the modified form of FIG. 2A, the display 100 can be substituted directly for the display 12 in one side of a pair of binoculars or other power scope which only contains a single light path and lens system.

It is therefore to be understood that while preferred and modified forms of invention are herein set forth and disclosed that the above and other modifications and changes may be made therein without departing from the spirit and scope of the present invention as defined by the appended claims.

I claim:

1. A rangefinder apparatus comprising:
   a scope including a transparent display disposed at a plane of focus between an occular and objective lens, said display having a reticle scale thereon provided with a series of numerical units in displayed vertically ascending order, said units being calibrated in relation to distance of a target from said display, said first recording means including a display counter on said display for displaying a selected said one of said units appearing on said reticle scale, and means for incrementing said display counter until the selected said one of said units is displayed which corresponds to said unit most closely aligned with an upper edge of the target object;
   first recording means for recording one of said units on said scale corresponding to the height of a target object viewed through said display;
   second recording means for recording a known height of said target object viewed in said display;
   programmable control means for calculating the distance of said target object from said display based on said recorded one of said units and said recorded known height; and
   means for displaying said range calculated by said control means.

2. Apparatus according to claim 1 wherein said scale is a fixed-stadia scale.

3. Apparatus according to claim 1, wherein said first recording means includes a movable pointer and means for incrementing said pointer up and down said scale to align said pointer with an upper edge of said target object.

4. Apparatus according to claim 1, wherein said display includes a list of known object heights, and scale height display means for displaying said known object heights on said display.

5. Apparatus according to claim 1, wherein said control means includes a memory for storing said known object heights, and said display means includes means for scrolling through said human object heights and displaying same on said display.

6. A rangefinder apparatus for determining the distance of a target object from said apparatus comprising:
   a scope including a transparent display disposed at a plane of focus between an occular and objective lens, said display having a scale with numerical units in ascending order displayed thereon, said units being calibrated in relation to distance of a target from said display and height-determining means for alignment with an upper edge of a target object viewed through said display;
   first recording means for recording a numerical value corresponding to the vertical distance of said height-determining means from a reference point on said scale whereby to correspond to the height of the target object viewed through said display;
   second recording means for recording a numerical value corresponding to a known height of said target object viewed in said display;
   programmable control means for calculating the distance of said target object from said display based on said recorded numerical values transmitted to said control means; and
   means for displaying said range calculated by said control means on the display.

7. Apparatus according to claim 6, wherein said height-determining means includes a series of adjustable shutters defining a variable-sized central aperture therebetween, and drive means for adjusting said shutters until the size of said aperture corresponds to the height of the target object viewed through said display.

8. Apparatus according to claim 6, wherein said height-determining means includes a movable pointer and means for incrementing said pointer in a vertical direction on said display to align said pointer with an upper edge of said target object viewed through said display.

9. Apparatus according to claim 6, wherein a display counter on said display is provided for displaying the numerical value recorded by said first recording means, and means for incrementing said display counter until the numerical value is displayed which corresponds to the numerical value recorded.

10. Apparatus according to claim 6, wherein said calibrated in vertical ascending order in relation to distance of a target object, and said height-determining means including means for selecting one of said units corresponding to the actual height of the target object and displaying on said display.

11. Apparatus according to claim 6, wherein said display includes a list of known object heights, and scale height display means for displaying said known object heights on said display.

12. Apparatus according to claim 11, wherein said control means includes a memory for storing said known object heights, and said display means includes means for scrolling through said human object heights and displaying same on said display.

13. In rangefinder apparatus wherein a scope includes a transparent display disposed between an occular and objective lens, said display having a reticle scale thereon provided with a series of numerical units in vertically ascending order, said units being calibrated in relation to distance of a target object from said display, the improvement comprising:

said display having an area for displaying known heights of different selected target objects;

first recording means for recording one of said units on said scale corresponding to the height of a target object viewed through said display, said first recording means including a display counter on said display for displaying a selected said one of said units appearing on said reticle scale, and means for incrementing said display counter until the selected said one of said units is displayed which corresponds to said unit most closely aligned with an upper edge of the target object;

second recording means for recording a known height of said target object viewed in said display;

programmable control means for calculating the distance of said target object from said display based on said recorded one of said units and said recorded known height; and means for displaying the distance calculated by said control means.

14. In apparatus according to claim 13, wherein said display includes a list of known object heights.

15. In apparatus according to claim 13, wherein said control means includes a memory for storing said known object heights, and said display means includes means for scrolling through said known object heights and displaying same on said display.

16. In rangefinder apparatus for determining the distance of a target object from said apparatus wherein a pair of binoculars includes a transparent display disposed at a plane of focus between an occular and objective lens, said display having height-determining means for alignment with an upper edge of a target object viewed through said display, the improvement comprising;

said height-determining means being in the form of adjustable shutters defining a variable height and size central aperture, and drive means for adjusting said shutters until the size of said aperture corresponds to the height of the target object viewed through said display;

a list of known objects associated with said display, and height display means for displaying the height of a selected known object on said display;

first recording means for recording a numerical value corresponding to the vertical distance of said height-determining means from a reference point on said scale whereby to correspond to the height of the target object viewed through said display;

second recording means for recording a numerical value corresponding to a known height of said target object viewed in said display;

programmable control means for calculating the distance of said target object from said display based on said recorded numerical values transmitted to said control means; and means for displaying said distance calculated by said control means on the display.

17. In apparatus according to claim 16, wherein a display counter on said display is provided for displaying the numerical value recorded by said first recording means, and means for incrementing said display counter until the numerical value is displayed which corresponds to the numerical value recorded.

18. In apparatus according to claim 16, wherein said control means includes a memory for storing said known object heights, and said display means includes means for scrolling through said human object heights and displaying same on said display.

19. A rangefinder apparatus for determining the distance of a target object from said apparatus comprising:

a scope including a transparent display disposed at a plane of focus between an occular and objective lens, said display having height-determining means for alignment with an upper edge of a target object viewed through said display, said height-determining means including a series of adjustable shutters defining a variable-sized central aperture therebetween, and drive means for adjusting said shutters until the size of said aperture corresponds to the height of the target object viewed through said display;

first recording means for recording a numerical value corresponding to the vertical distance of said height-determining means from a reference point on said scale whereby to correspond to the height of the target object viewed through said display;

second recording means for recording a numerical value corresponding to a known height of said target object viewed in said display;

programmable control means for calculating the distance of said target object from said display based on said recorded numerical values transmitted to said control means; and means for displaying said range calculated by said control means on the display.

\* \* \* \* \*